United States Patent [19]

Atchley

[11] Patent Number: 4,821,678
[45] Date of Patent: Apr. 18, 1989

[54] AVIAN WATER BOTTLE ASSEMBLY

[76] Inventor: Frank W. Atchley, P.O. Box 2580, Napa, Calif. 94558

[21] Appl. No.: 62,571

[22] Filed: Jun. 16, 1987

[51] Int. Cl.$^4$ .............................................. A01K 31/00
[52] U.S. Cl. ..................................................... 119/18
[58] Field of Search ..................... 119/18, 24, 26, 72.5; 248/224.3, 224.4, 225.1, 231.1, 236.1, 300, 311.3

[56] References Cited

U.S. PATENT DOCUMENTS

| | | | |
|---|---|---|---|
| 1,029,144 | 6/1912 | Rich | 119/18 |
| 2,190,119 | 2/1940 | Hoefler | 119/18 |
| 2,221,840 | 11/1940 | Little | 119/18 |
| 2,309,830 | 2/1943 | Dearle | 119/18 |
| 2,731,229 | 1/1956 | Seitz | 248/300 |
| 3,178,138 | 4/1965 | Hessdoerfer et al. | 248/300 |
| 3,320,929 | 5/1967 | Kay | 119/18 |
| 3,696,233 | 10/1972 | Pulsifer | 248/230 |
| 3,838,664 | 10/1974 | Atchley | 119/72.5 |
| 4,393,813 | 7/1983 | Sou | 119/72.5 |

FOREIGN PATENT DOCUMENTS

| | | | |
|---|---|---|---|
| 10892 | 5/1911 | United Kingdom | 119/18 |
| 355863 | 9/1931 | United Kingdom | 119/18 |
| 800654 | 8/1958 | United Kingdom | 119/81 |

Primary Examiner—Robert Peshock
Assistant Examiner—R. Thomas Price
Attorney, Agent, or Firm—Harris Zimmerman; Howard Cohen

[57] ABSTRACT

A watering system for caged birds and the like includes a water bottle having a planar side adapted to be disposed adjacent to the cage wall. The bottle includes a T-shaped member extending from the planar side, and a bracket securable to the cage wall includes a slot dimensioned to receive the T member in removable fashion with the bottle depending therefrom. The bracket includes a medial panel, and arms extending from the opposed ends of the medial panel and joined thereto by integral hinge portions. The arms are adapted to be passed through the gaps between the wires of the cage, and to be folded back in confronting relationship with the medial panel, with aligned screw holes and tapped holes in the medial panel and arms provided to secure the bracket to the cage wires. The bottle includes a lower end surface inclined toward the cage wall, and a wide mouth opening extending therethrough. A cap is secured to the opening in sealing relationship, with a dispensing spout extending from the cap through the cage wires. The lower end of the dispensing spout includes a tapering flange which retains a red-colored oval ball within the spout and dimensioned to extend partially from the lower end thereof to attract the attention of a bird.

17 Claims, 3 Drawing Sheets

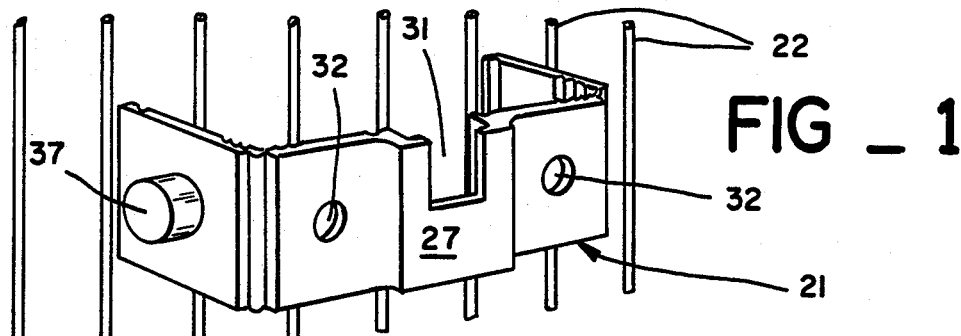
FIG_1
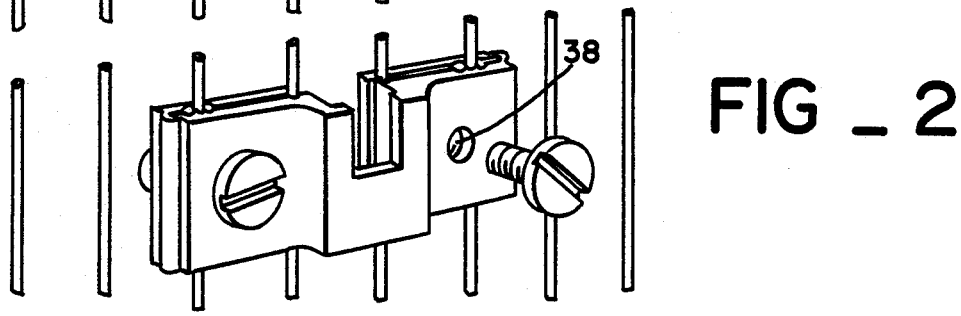
FIG_2
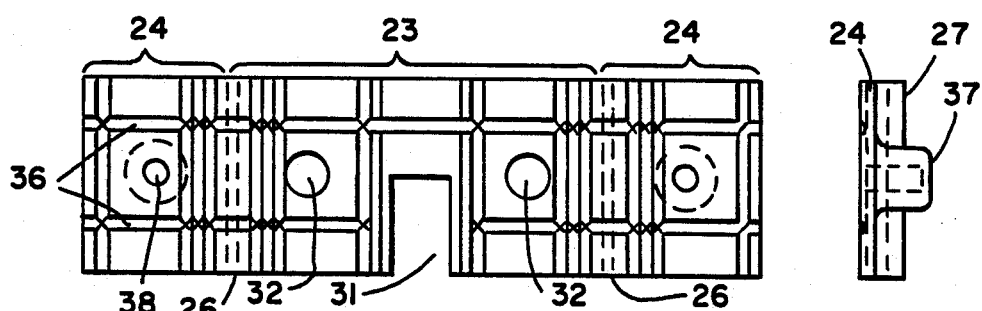
FIG_3
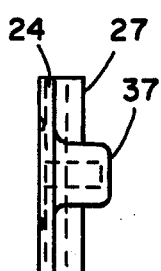
FIG_4
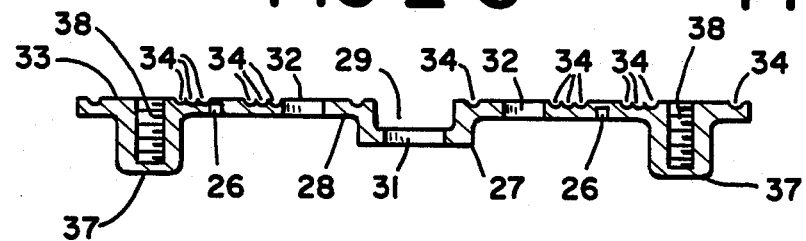
FIG_5
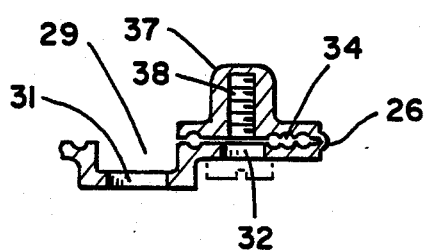
FIG_6

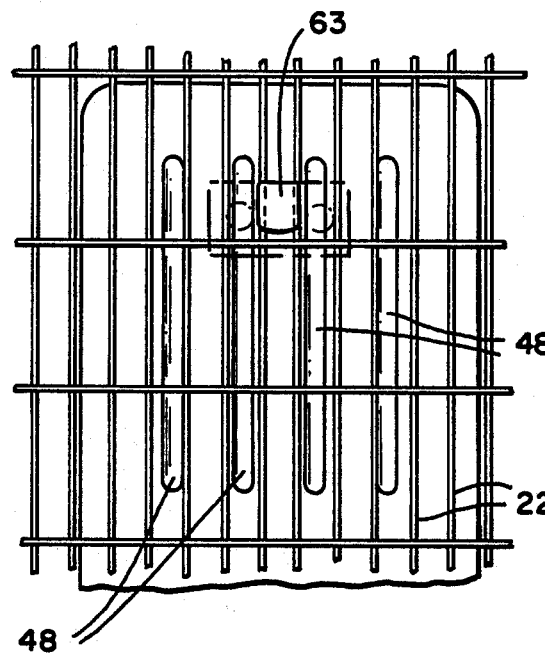
FIG _ 7
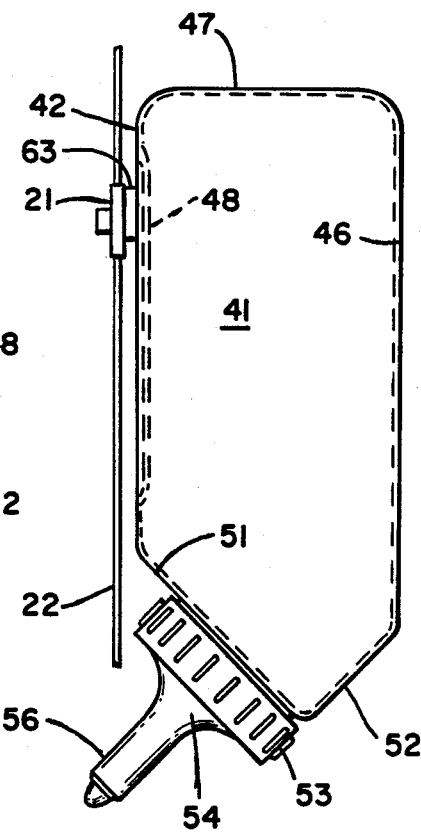
FIG _ 8
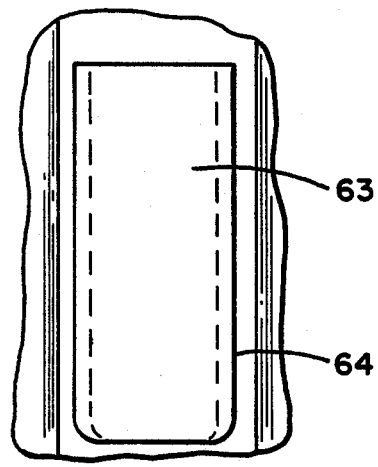
FIG _ 9
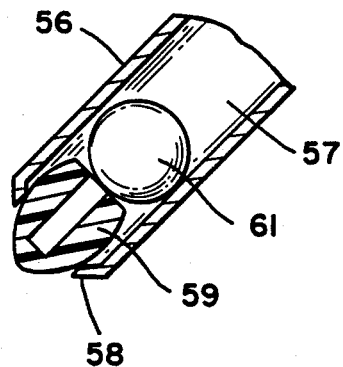
FIG _ 10

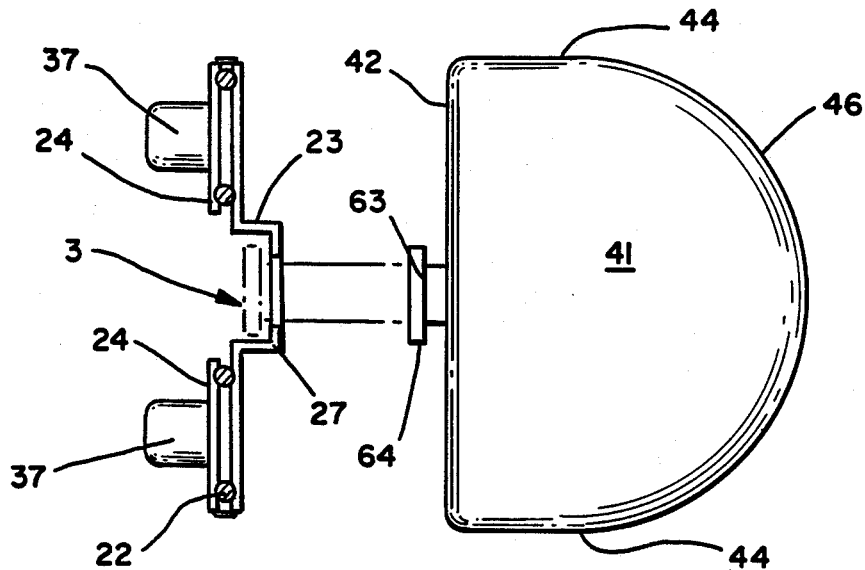
FIG _ 11
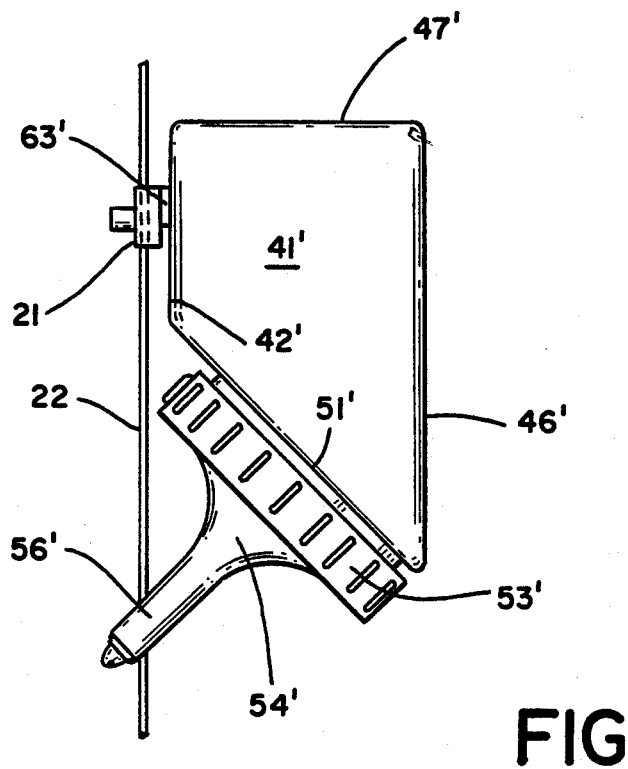
FIG _ 12

AVIAN WATER BOTTLE ASSEMBLY

BACKGROUND OF THE INVENTION

The care and feeding of animals in laboratory and commercial purposes and the like is a large endeavor carried on throughout the world. Often animals must be raised in very clean environments, and in very large numbers. It is necessary to keep to an absolute minimum the cost for raising each animal, due to the large numbers involved. It is also necessary to assure that the animals remain healthy in their cages.

A primary necessity in animal maintenance is providing water in sufficient amounts or on demand. It is generally true that the easiest way to provide fresh water is in open watering systems such as troughs having flowing water therein. However, open systems are most easily contaminated by polluting materials. In the special case of birds maintained in a caged environment, the birds tend to fan their wings instinctively, for exercise, body cooling purposes, and the like. This habitual behavior creates air currents that blow pollutants such as droppings, feathers, trash, and foot into open watering systems. Contamination of the water causes disease in the animals, and the open watering system spreads the disease to nearby animals.

On the other hand, closed watering systems are far more resistant to contamination. Such systems generally comprise a water bottle affixed to each animal cage by a tension spring or the like, and a dispensing spout extending into the cage for the animal. However, water held in a bottle at ambient temperature tends to foster the growth of microorganisms within a short time, and it is necessary to frequently clean the water bottles and replace the water therein. These factors lead to a labor intensive endeavor that is costly both in outlays for individual water bottles and for the labor in maintaining the bottles.

Moreover, it is common wisdom that birds cannot be trained to drink from a closed watering system, in which it is necessary to act on a dispensing valve or element to release water. Thus most caged birds are provided with open water systems, such as fountains with open water surfaces, and the problems of water contamination and pollution continue unabated.

It is obvious that cost is a critical factor in maintaining animals in cages. Manufacturing cost of feeding and watering devices must be kept to a minimum. In addition, any improvement which decreases the cost of each bottle, or which decreases the time required to clean and fill each bottle would result in substantial savings.

Also, it is generally true that high sanitation standards must be maintained in most animal facilities. A drawback of prior art systems is that the spherical ball used to dispose the water is capable of rotating, and is indeed driven to rotate by the pecking action of the bird seeking water, if a bird can be trained for this task. The rotating ball delivers a drop of water to the animal, and returns minute bubbles of air to the feed tube to replace the water thus dispensed. The rotating effect unfortunately transfers saliva and food particles into the feed tube, where rising bubbles often carry the contaminating material upwardly to the tank supply. This action significantly degrades the quality of the water in the tank, and promotes the growth of algae and bacteria. It can also adversely affect the health of the animal.

Also, most water bottles known in the prior art for animal purposes employ a generally narrow opening and a narrow threaded cap which compressively seals the delivery tube to the bottle opening. Although this approach forms a generally sufficient seal, it also creates a difficult problem in attempting to clean the bottle to prevent undue accumulations of algae and bacteria in the bottles.

A further problem with prior art devices is that the means for metering the water flow to the animal are subject to wide fluctuations. The spherical ball may become lodged upwardly from the lower end of the tube, and prevent water flow to the animal. If an animal (especially lab animals) does not have water for even a short period of time, the animal's health may be adversely affected. Likewise, air bubbles may become trapped in the bent feed tube of prior art devices, and prevent water flow, with the same dire results.

SUMMARY OF THE PRESENT INVENTION

The present invention generally comprises an animal watering assembly that is adapted to provide water to caged animals, and in particular to birds housed in cages. A salient feature of the invention is the provision of a watering bottle and bottle supporting bracket, the bracket being secured to the cage and the bottle being formed to be releasably secured to the bracket. Thus the bottle may easily be removed from the bracket for cleaning and refilling. In addition, the bottle is provided with a wide filling opening to facilitate filling and cleaning.

The watering system for caged birds and the like includes a water bottle having a planar side adapted to be disposed adjacent to the cage wall. The bottle includes a T-shaped member extending outwardly from the planar side, and the bracket securable to the cage wall includes a slot dimensioned to receive the T member in removable fashion with the bottle depending therefrom. The bracket includes a medial panel, and arms extending from the opposed ends of the medial panel and joined thereto by integral hinge portions. The arms are adapted to be passed through the gaps between the wires of the cage, and to be folded back in confronting relationship with the medial panel, with aligned screw holes and tapped holes in the medial panel and arms provided to secured the bracket to the cage wires.

The bottle includes a lower end surface inclined toward the cage wall, and the wide mouth opening extending therethrough. A cap is secured to the opening in sealing relationship, with a dispensing spout extending from the cap through the cage wires. The lower end of the dispensing spout includes a tapering flange which retains a red-colored oval ball within the spout and dimensionsed to extend partially from the lower end thereof to attract the attention of a bird. The red oval ball may be formed of colored plastic material, and a metal ballast ball may be disposed above the oval ball to maintain the oval ball in sealing relationship against the flange. Alternatively, the ovall ball may be formed of red colored glass to provide sufficient weight to remain at the bottom of the feed tube against the lower flange.

BRIEF DESCRIPTION OF THE DRAWING

FIG. 1 is a perspective view of the mounting bracket of the present invention, shown partially folded and installed on a typical wire cage.

FIG. 2 is a perspective view as in FIG. 1, showing the mounting bracket secured to the wires of the cage.

FIG. 3 is a front elevation of the mounting bracket shown in FIGS. 1 and 2.

FIG. 4 is an end view of the mounting bracket of the present invention.

FIG. 5 is a top view of the mounting bracket of the present invention.

FIG. 6 is an enlarged, cross-sectional top detail view of the screw mounting arrangement of the mounting bracket.

FIG. 7 is a view from inside the wire cage, showing the mounting of the water bottle of the present invention on the mounting bracket.

FIG. 8 is a side view of the water bottle secured to the wire cage, as in FIG. 7.

FIG. 9 is an enlarged, detail view of the T-shaped mounting member extending from the water bottle.

FIG. 10 is a cross-sectional detail of the flow control ball arrangement in the dispensing spout of the present invention.

FIG. 11 is a schematic view of the interconnection of the water bottle and the mounting bracket of the present invention.

FIG. 12 is a side view of a further embodiment of the water bottle of the present invention.

DESCRIPTION OF THE PREFERRED EMBODIMENT

The present invention generally comprises a watering system particularly adapted to serve birds maintained in cages, although its use can be extended to providing water to other caged animals. A significant feature of the invention is the provision of a water bottle-mounting bracket assembly that permits quick and easy removal of the bottle from the cage. The invention also features a closed water bottle that virtually eliminates pollution and contamination of the water, and is easy to clean and refill. The bottle further includes a water dispensing system that provides water on demand to the bird, and does not dip into the cage during non-demand times.

With regard to FIG. 1-5, a salient feature of the invention is the provision of a water bottle mounting bracket 21 adapted to be affixed to the wires 22 that comprise the typical bird cage or animal cage. The bracket 21 is comprised of a medial panel portion 23 and a pair of panel-like arms 24 extending from the opposed ends of the medial panel and joined thereto by hinge portions 26. The medial portion, the hinges, and the arms 24 may be formed integrally from a single piece of molded resilient plastic material. The medial portion 23 is provided with a channellike boss 27 extending outwardly from the front surface 28 there of and defining a vertically extending channel cavity 29. A slot 31 extends vertically in the boss 27 along a portion of the length thereof. A pair of screw holes 32 extend through the medial panel on either side of the boss 27.

The rear surface 33 of the medial panel and the arms 24 are provided with a plurality of vertical grooves 34 formed therein and spaced equidistantly from the hinge 26. The grooves are disposed so that the respective grooves on the arms and the medial panel are brought into confronting alignment with the arms are folded along the hinges and the rear surfaces of the arms are moved into opposition to the rear surface of the medial panel, as in FIG. 6. The grooves 34 are spaced so that in confronting alignment they capture the vertical wires 22 of the cage, as in FIG. 2, and the plurality of grooves are disposed to accommodate the various wire spacings commonly used in animal and bird cages. In addition, lateral grooves 36 are also formed in the rear surface 33 and spaced to engage the horizontal wires usually provided on such cages.

Each of the arms is also provided with a boss 37 extending outwardly from the outer surface 28 thereof, with a tapped hole 38 extending from the rear surface 33 therein. The boss 37 and the tapped hole 38 are disposed so that they are brought into confronting alignment with the respective screw hole 32 when the respective arm is folded back about the hinge 26, as shown in FIG. 6. A pair of screws may then be secured through the holes 32 in the tapped holes 38 to secure the bracket to the cage wires 22 in a relatively permanent installation.

Another significant component of the present invention is a water bottle 41 adapted to cooperatively engage the bracket 21, as shown in FIGS. 8 and 11. The bottle 41 includes a planar side wall 42, a pair of end walls 44 extending contiguously therefrom, and a curved side wall 46 joining the end walls 44 and disposed in opposition to the wall 42. The upper end of the bottle 41 is closed by a panel 47 extending between the upper extents of the walls 42, 44, and 46. The planar side wall 42 is provided with a plurality of spaced, narrow channels 48 molded integrally therein to increase the stiffness of the wall and limit its flexure.

At the lower end of the bottle 41 an oblique wall 51 extends from the planar side wall at an angle of approximately 45°. A shorter oblique wall 52 extends from the other side wall 46 to intersect with the wall 51 at a crest defined thereby. A wide mouth opening is formed in the wall 51, with a neck extending therefrom bearing integrally molded threads. A cap 53 is secured to the threaded neck, and a tapering panel 54 extends to a tubular dispensing spout 56. The spout 56 includes an interior bore 57 leading to the liquid reservoir within the bottle, and an annular flange 58 extends inwardly at the lower end of the spout. An oval ball liquid dispsensing arrangement as disclosed in copending U.S. patent application Ser. No. 06/875,963, filed June 19, 1986 by Frank Atchley, may be employed in the spout 56 to dispense water to the bird or animal. This disclosure is incorporated herein by reference.

The invention may be augmented by coloring the oval ball red, so that birds are attracted to the ball, and by pecking at it will become trained to demand and receive water from it. Alternatively, as shown in FIG. 10, a red colored plastic oval ball 59 may be secured within the bore 57, dimensioned with a major axis greater than the diameter of the bore 59 and a minor axis less than the bore diameter, so that the ball 59 may translate within the bore and be retained therein by the flange 58. The ball 59 is dimensioned to function as described in the patent noted above. In addition, due to the fact that the plastic is less dense than the preferred stainless steel material, the upper end of the ball 59 is truncated orthogonally, and a second, ballast ball 61 is formed of stainless steel or the equivalent is disposed atop the truncated surface of the oval ball. The ball 61 provides sufficient weight to assure that the oval ball 59 will maintain engagement with the flange 58, unless animal pecking action drives the ball 59 upwardly in the tube to release water to the animal. The weight of the ball 61 acts to quickly urge the ball 59 back into engagement with the flange 58. As a further alternative, the oval ball may be formed of red colored glass material, or glass coated metal, so that the red color is present and sufficient density is provided to assure that the oval ball will tend to seat in the flange 58.

A salient feature of the invention is the provision of a T-shaped member 63 extending outwardly from the upper medial extent of the planar wall 42, as shown in FIGS. 7-12. The T member is integrally molded in the wall panel 42. The broad end 64 of the T-shape is disposed outwardly of the wall 42, with the stem of the T extending therebetween. The portion 64 is dimensioned to be received in the channel cavity 29 in sliding engagement, and the narrow stem of the T is dimensioned to be received through the slot 31 with clearance. Thus the bottle 41 may be secured to the cage wall by engaging the T member 63 in the boss 27 of the bracket 21 in sliding fashion, with the spout 56 extending obliquely from the lower end of the bottle through the wires of the cage to be used by the animal therein. To remove the bottle 41 for cleaning or refilling, it is necessary only to lift the bottle vertically to release the T member 63 from the bracket. Likewise, the wide mouth opening and cap 53 facilitates easy cleaning of the interior of the bottle, so that contamination, algae scale, and the like may easily be removed.

It should be noted that the reinforcing channels 48 comprise ribs that increase the stiffness of the largest planar portion of the bottle, the wall 42. These ribs reduce flexure of the wall 42, due to changes in ambient air pressure, temperature, and handling, and reduce the amount of leakage from the bottle through the spout. The bottle is molded of plastic colored with an amber coloring agent which is opaque to Ultraviolet light, thereby preventing degradation of water soluble viatmin supplements added to the water supply.

When the bottle 41 is filled, capped, and inverted, water (or other liquid) will drain from the spout until a partial vacuum is established in the bottle, and then slowly drip until the water warms to the ambient temperature. Occassional drops like glistening dew drops then form on the oval ball extending from the spout, attracting the birds attention by sight and smell. This attraction, in addition to the red color of the oval ball, acts to train the bird to displace the oval ball to receive drops of water. Thus birds can be habituated to drinking from a closed reservoir system which is not susceptible to contamination and pollution.

An alternative embodiment of the bottle is shown in FIG. 12, in which similar components are given the same reference numeral as for the previous embodiment, with the addition of a prime (') designation. The bottle 41' is formed of side walls 42', 44' and 46', with the exception that the vertical extent of all these walls is greatly diminished. In addition, the oblique wall 51' extends from the planar wall 42' to an intersection with the arcuate side wall 46', and the short oblique wall 52 is eliminated. Due to the smaller dimensions of the bottle 41', the reinforcing ribs 48 are also eliminated. The T-shaped member 63' extends from the planar wall 42' as described above, and is also dimensioned identically thereto.

I claim:

1. A watering system for a bird or like animal maintained in a cage, including a water bottle, a mounting bracket adapted to be secured to a wall of the cage, a mounting member extending from said bottle, means on said mounting bracket for releasably engaging said mounting means, said mounting bracket including a medial portion and at least one arm portion extending from an end of said medial portion, hinge means extending between said medial portion and said arm portion to permit rotation of said arm portion into confronting opposition with said medial portion with portions of the wall of the cage engaged therebetween, a screw hole extending through said medial portion, and a tapped hole extending in said arm portion, said screw hole and said tapped hole being disposed to be aligned in operative relationship when said arm portion is rotated into said confronting opposition to said medial portion.

2. A water system for a bird or like animal maintained in a cage, including a water bottle, a mounting bracket adapted to be secured to a wall of the cage, a mounting member extending from said bottle, means on said mounting bracket for releasably engaging said mounting means, said mounting bracket including a medial portion and at least one arm portion extending from an end of said medial portion to permit rotation of said arm portion into confronting opposition with said medial portion with portions of the wall of the cage engaged therebetween, said arm portion and said medial portion including a first plurality of grooves extending therein, said grooves being disposed to be aligned in parallel, confronting relationship when said arm portion is rotated into said confronting opposition to said medial portion.

3. The watering system of claim 2, further including a second plurality of grooves extending in said arm portion and said medial portion and intersecting said first plurality of grooves in generally orthogonal relationship.

4. A mounting bracket for removably securing a liquid dispensing reservoir to a wire cage wall, including a medial panel portion, a pair of arm panel portions, integral hinge means extending between said medial panel portion and said arm panel portions to permit rotation of said arm portions into confronting opposition with said medial portion with portions of the wire cage wall engaged therebetween, and means on said mounting bracket for releasably engaging a portion of said liquid dispensing reservoir, wherein said arm portions and said medial portion include a first plurality of grooves extending therein, said grooves being disposed to be aligned in parallel, confronting relationship when said arm portion is rotated into said confronting relationship when said arm portion to engage and retain wires of said wire cage wall.

5. The mounting bracket of claim 4, further including a second plurality of grooves extending in said arm portion and said medial portion and intersecting said first plurality of grooves in generally orthogonal relationship.

6. A mounting bracket for removably securing a liquid dispensing reservoir to a wire cage wall, including a medial panel portion, a pair of arm panel portions, integral hinge means extending between said medial panel portion and said arm panel ortions to permit rotation of said arm portions into confronting opposition. with said medial portion with portions of the wire cage wall engaged therebetween, means on said mounting bracket for releasably engaging a portion of said liquid dispensing reservoir, said means on said mounting bracket for releasably engaging a portion of said liquid dispensing reservoir including a channel formed in said medial panel portion, and a slot extending through said channel and extending along a portion of the length thereof.

7. A watering system for a bird or like animal maintained in a cage, including a water bottle, a mounting bracket adapted to be secured to a wall of the cage, a mounting member extending from said bottle, and means on said mounting bracket for releasably engaging said mounting member, said mounting bracket including a medial portion and at least one arm portion extending from an end of said medial portion, hinge means extending between said medial portion and said arm portion to permit rotation of said arm portion into confronting opposition with said medial portion with portions of the wall of the cage engaged therebetween, and means for joining said arm portion and medial portion in compressive fashion to secure said mounting bracket to said portions of the wall of the cage engaged therebetween.

8. A watering system for a bird or like animal maintained in a cage, including a water bottle, a mounting bracket adapted to be secured to a wall of the cage, a mounting member extending from said bottle, and means on said mounting bracket for releasably engaging said mounting member, said water bottle including a generally planar wall portion adapted to be disposed in impingement with the outer surface of the wall of the cage, said mounting member extending outwardly from said planar wall portion, and a plurality of reinforcing ribs formed in said planar wall portion.

9. The watering system of claim 8, said water bottle further including a dispensing spout extending obliquely downwardly from the lower extent thereof, said dispensing spout disposed to extend through the wall of the cage to be interior thereof.

10. The watering system of claim 9, wherein said dispensing spout includes a tubular member having a tapered flange at the lower end thereof, and an oval ball water dispensing member disposed in said tubular member and retained by said tapered flange, said oval ball being colored red.

11. The watering system of claim 10, further including a second ball disposed in said tubular member and disposed to drive said oval ball gravitally downwardly toward said tapered flange.

12. A watering system for a bird or like animal maintained in a cage, comprising a water bottle having at least an upper end wall and a sidewall, a mounting bracket adapted to be secured to a wall of the cage, a mounting member extending from said bottle, means on said mounting bracket for releasably engaging said mounting means, said mounting member extending from said sidewall of said bottle in integrally formed fashion, said mounting bracket including a medial portion and at least one arm portion extending from an end of said medial portion, and hinge means extending between said medial portion and said arm portion to permit rotation of said arm portion into confronting opposition with said medial portion with portions of the wall of the cage engaged therebetween.

13. The watering system of claim 12, wherein said mounting bracket includes a pair of arm portions exending from opposed ends of said medial portion.

14. The watering system of claim 12, further including a screw hole extending through said medial portion, and a tapped hole extending in said arm portion, said screw hole and said tapped hole being disposed to be aligned in operative relationship when said arm portion is rotated into said confronting opposition to said medial portion.

15. The watering system of claim 12, wherein said arm portion and said medial portion include a first plurality of grooves extending therein, said grooves being disposed to be aligned in parallel, confronting relationship when said arm portion is rotated into said confronting opposition to said medial portion.

16. A mounting bracket for removably securing a liquid dispensing resevoir to a wire cage wall, including a medial panel portion, a pair of arm panel portions, integral hinge means extending between said medial panel portion and said arm panel portions to permit rotation of said arm portions into confronting opposition with said medial portion with portions of the wire cage wall engaged therebetween, and means on said mounting bracket for releasably engaging a portion of said liquid dispensing reservoir.

17. The mounting bracket of claim 16, wherein said means on said mounting bracket for releasably engaging a portion of said liquid dispensing reservoir includes a channel formed in said medial panel portion, and a slot extending through said channel and extending along a portion of the length thereof.

* * * * *